US005266740A

United States Patent [19]

Hsu

[11] Patent Number: 5,266,740

[45] Date of Patent: Nov. 30, 1993

[54] PROTECTING COVER FOR A COAXIAL CONNECTOR

[76] Inventor: Cheng S. Hsu, No. 285, Kaishan Rd., Tainan, Taiwan

[21] Appl. No.: 875,659

[22] Filed: Apr. 29, 1992

[51] Int. Cl.[5] .......... H02G 3/02

[52] U.S. Cl. .......... 174/72 C; 174/71 R; 174/71 C; 174/72 A; 174/92; 174/135; 285/159

[58] Field of Search .......... 174/135, 71 R, 72 C, 174/71 C, 72 R, 72 A, 92; 285/156, 419

[56] References Cited

U.S. PATENT DOCUMENTS

| | | | |
|---|---|---|---|
| 371,808 | 10/1887 | Waring | 174/71 R |
| 992,821 | 5/1911 | Stewart | 174/135 |
| 2,996,567 | 8/1961 | Channell et al. | 174/92 |
| 3,258,731 | 6/1966 | Still et al. | 439/135 |
| 3,711,633 | 1/1973 | Ghirardi et al. | 174/135 |
| 3,920,306 | 11/1975 | Barnett, Jr. et al. | 439/459 |
| 4,581,265 | 4/1986 | Follette | 174/DIG. 11 |
| 4,797,512 | 1/1989 | Kumagai et al. | 174/135 |

FOREIGN PATENT DOCUMENTS

| | | | |
|---|---|---|---|
| 7507218 | 12/1976 | Netherlands | 258/921 |

*Primary Examiner*—Leo P. Picard
*Assistant Examiner*—Hyung S. Sough
*Attorney, Agent, or Firm*—Webb, Burden, Ziesenheim & Webb

[57] ABSTRACT

A protecting cover for coaxial connectors includes a pair of half T-shaped casing members which are pivotally connected together by a linking portion for receiving a T-type coaxial connector assembly. The protecting cover has a pair of plugs and sockets respectively formed in lateral portions of each casing member in one side just opposite to the linking portion for engaging the two casing members together to enclose the coaxial connector assembly therein. A hook is formed on the surface of one of the casing members to hang the protecting cover in an appropriate place.

4 Claims, 5 Drawing Sheets

PROTECTING COVER FOR A COAXIAL CONNECTOR

BACKGROUND OF THE INVENTION

This invention relates to a protecting cover for a coaxial connector assembly.

The coaxial connector is usually placed on a table or a floor or hung in the air, which is easily adhered to by with dust, causing noise. Also, as the connector is made of metal, it easily induces static charge, causing electric shock and causing interference on devices, such as computers, connected thereto. Therefore, there is a need for a device which protects a coaxial connecter from these defects.

SUMMARY OF THE INVENTION

It is an object of the present invention to provide a protecting cover for a coaxial connector assembly in order to prevent dust from adhering to the connector and causing noise;

It is another object of the present invention to provide a protecting cover for a coaxial connector assembly in order to prevent static charge from accumulating on the connector, which might cause shock or interference.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
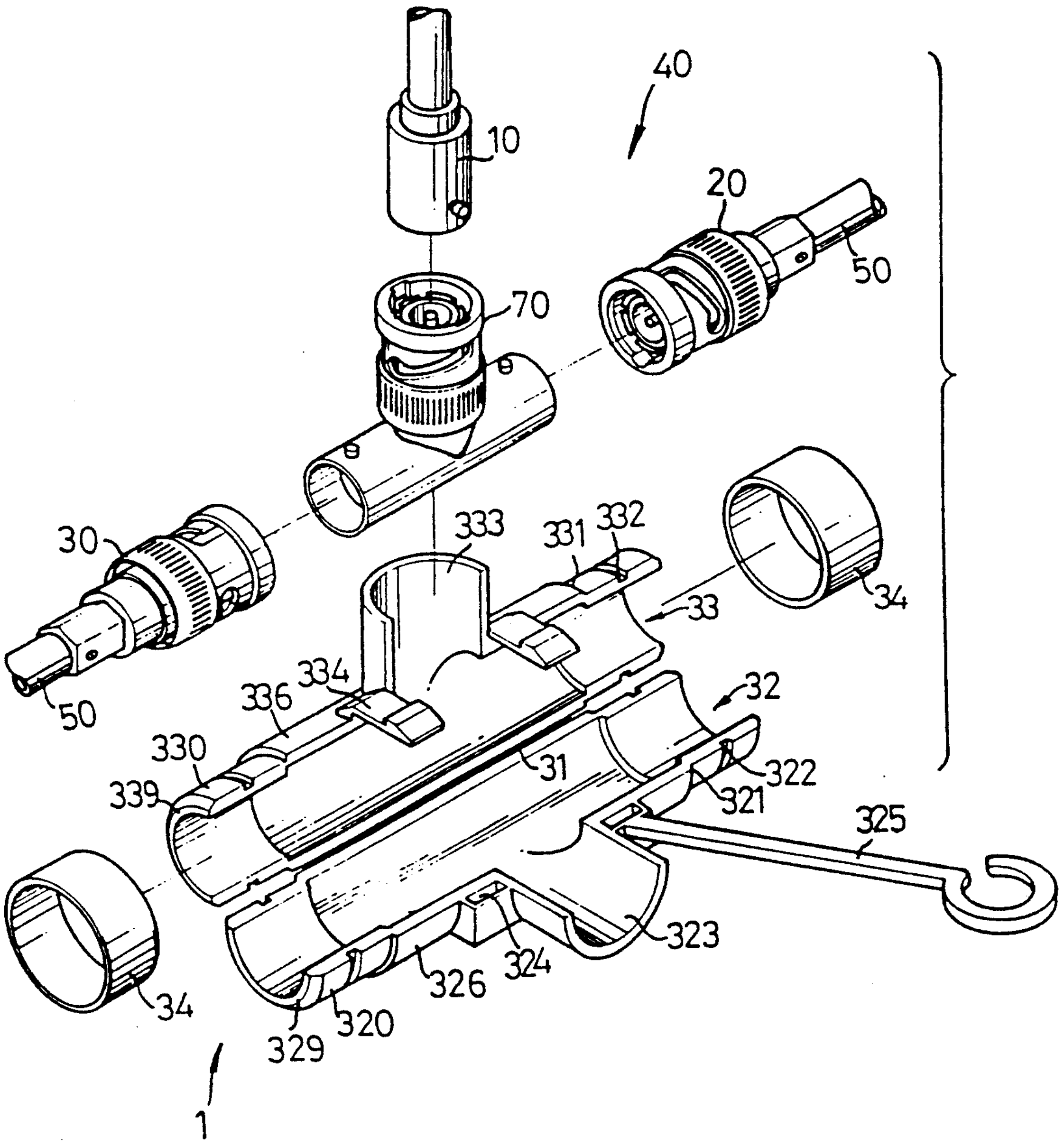
FIG. 1 is an exploded view of a protecting cover of the present invention for enclosing a coaxial connector assembly shown in a preferred embodiment.
Figure 7:
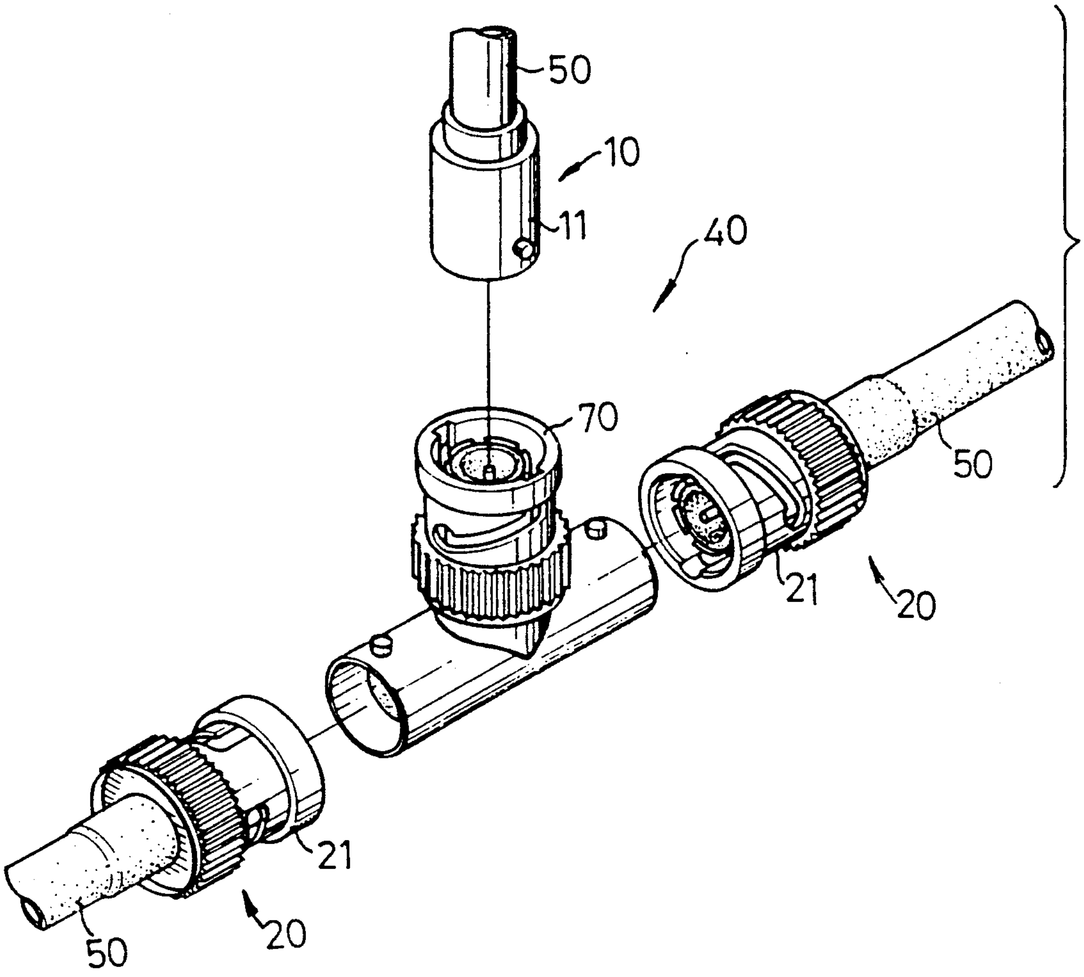
FIG.7 PRIOR ART
FIG. 7 is a perspective view of a coaxial connector assembly.

FIG. 7 illustrates a conventional T-type connector 70, a first cable 10 which has a cable portion 50 and terminal portion 11, and a second cable 20 which has a cable portion 50 and a terminal portion 21. The terminal portions 11 and 21 together with the T-type connector 70 are defined as a coaxial connector assembly 40 is defined as L-shaped. In FIG. 1, a similar coaxial connector assembly 40 is defined as T-shaped because of a third cable 30, which is identical to the second cable 20, is added to the left side of the connector 70.

Referring to FIG. 1, a protecting cover 1 for a coaxial connector assembly 40 comprises a first half T-shaped casing portion 33 and a second half T-shaped casing portion 32 pivotally connected to the first casing portion 33 with a linking portion 31 for releasably receiving the conventional coaxial connector assembly 40. The first casing portion 33 essentially comprises a first longitudinal portion 333 and a first lateral portion 336. The second casing portion 32 also essentially comprises a second longitudinal portion 323 and a second lateral portion 326.

Two plug portions 334 extend from the first lateral portion 336 on both sides of the first longitudinal portion 333, and in a corresponding position on the second lateral portion 326 are formed two socket portions 324 for receiving the two plug portions 334. The casing portions 33 and 32 are engaged by the plugs 334 and sockets 324. A hook 325 extends from one of the sockets 324 for hanging the protecting cover 1 with the coaxial connector assembly 40 therein in an appropriate position.

In two ends of the first and the second lateral portion 336 and 326 are respectively formed with first half-annular protrusions 330 and second half-annular protrusions 320. Each first half-annular protrusion 330 is situated between a shoulder portion 331 and an end portion 339. Each second half-annular protrusion 320 also has a shoulder portion 321 in one end and an end portion 329 in another end. When the first and second casing portions 33 and 32 are engaged, each facing pair of the first and second half-annular protrusions 330 and 320 forms an annular protrusion, respectively.

Figure 2:
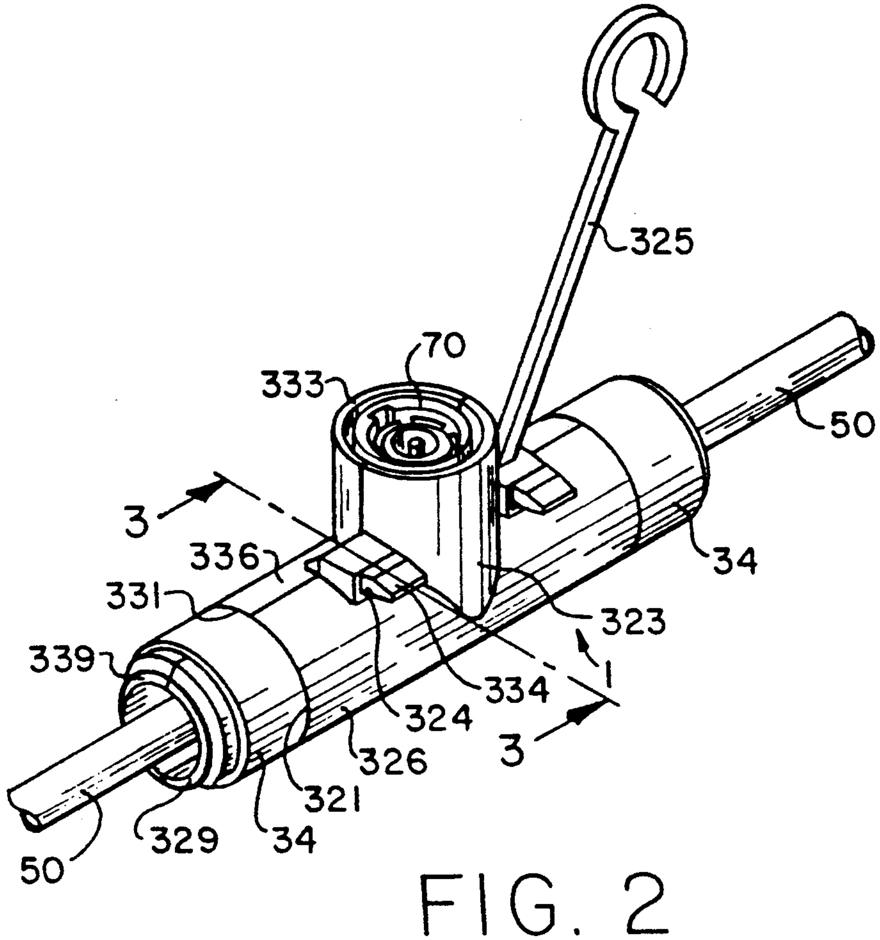
FIG. 2 is a perspective view of the protecting cover enclosing a coaxial connector assembly.
Figure 3:
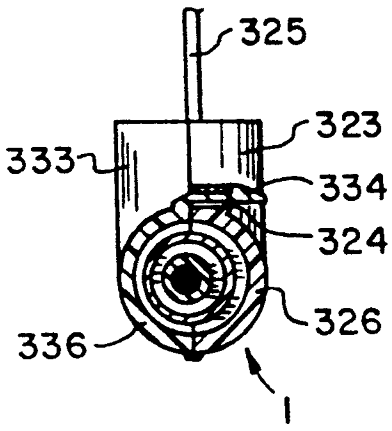
FIG. 3 is a cross-sectional view taken along line 3—3 of FIG. 2.
Figure 4:
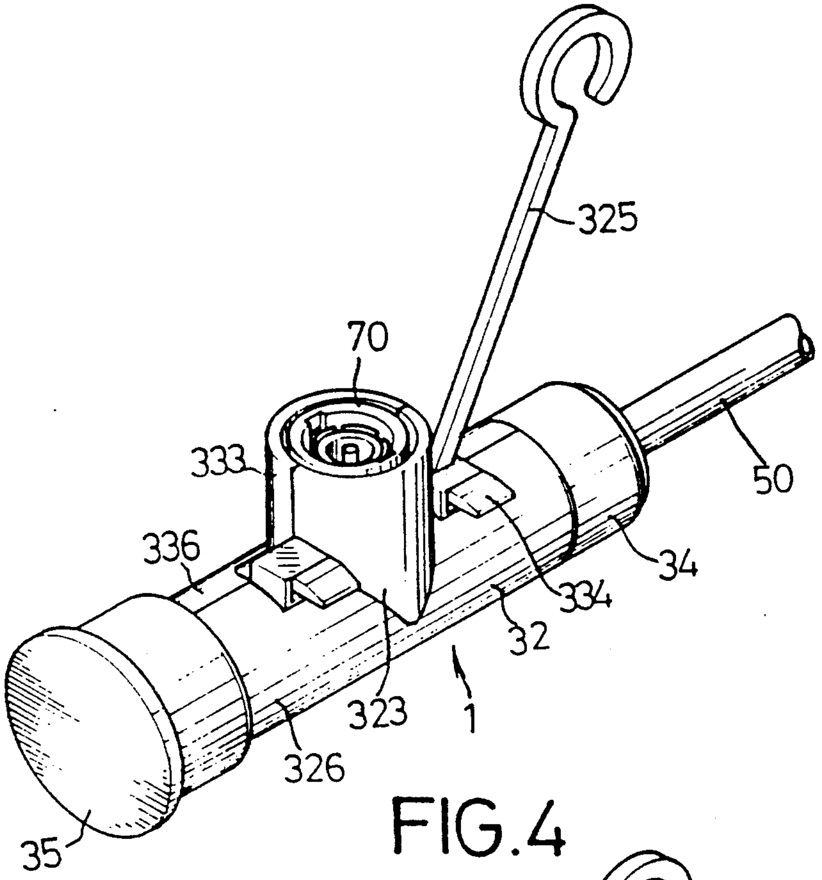
FIG. 4 is a view similar to FIG. 2 shown with a cap.
Figure 5:
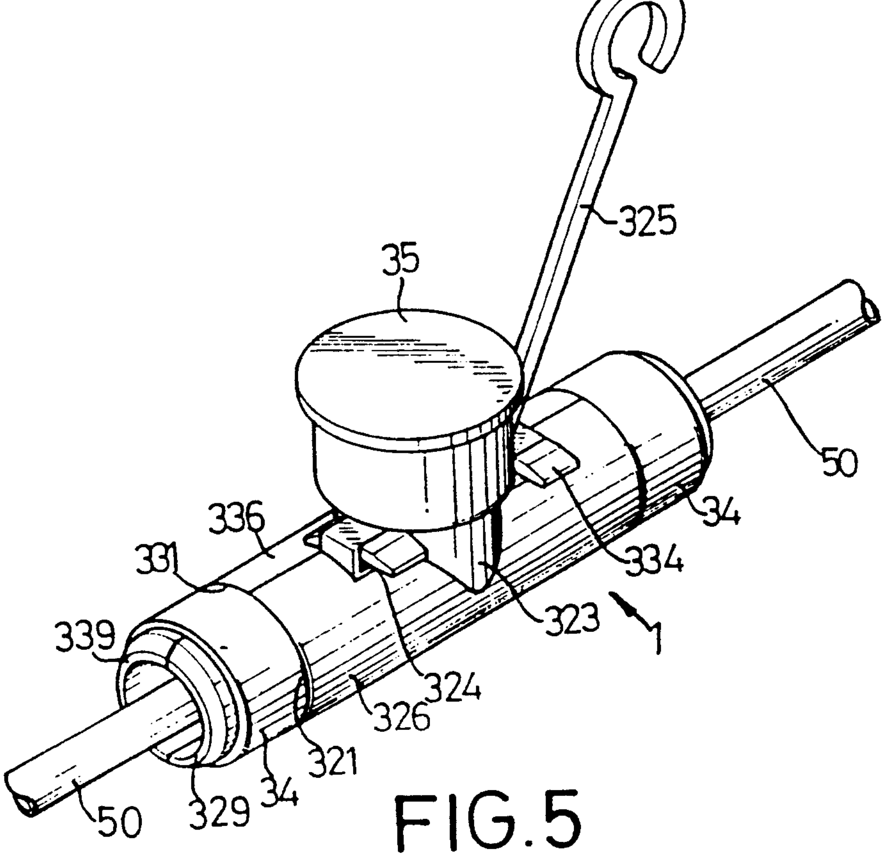
FIG. 5 is a view similar to FIG. 4 with the cap in a different position.

The protecting cover 1 further comprises an annular holding means 34 for holding the annular protrusion 330 and 320 together for further securing the two casing portions 33 and 32, with the shoulder portions 321 and 331 blocking the annular holding means 34 in one direction. FIGS. 2 and 3 show the protecting cover 1 enclosing the conventional coaxial connector assembly 40. If the T-type connector 70 is merely used as an L-type connector, with one lateral end open, then a cap 35 is used to cover the open end for preventing dust from entering the connector 70. Similarly, when a longitudinal portion of the T-type connector 70 is open, the cap 35 covers this open end, as shown in FIG. 5.

Referring to FIG. 1 again, a first half-annular groove 332 is formed in each first half-annular protrusion 330 substantially between the shoulder portion 331 and the end portion 339, and a second half-annual groove 322 is formed in each second half-annular protrusion 320 substantially between the shoulder portion 321 and the end portion 329, such that when the casing portions 33 and 32 are coupled, the half-annular grooves 332 and 322 together form an annular groove.

Figure 6:
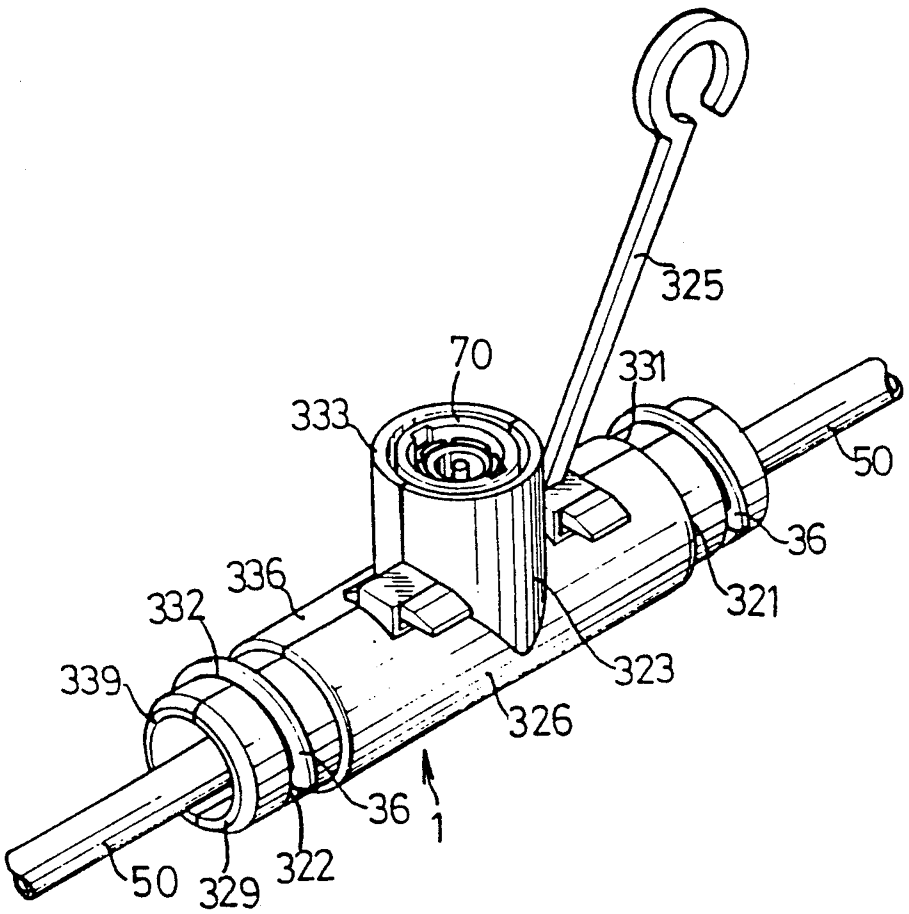
FIG. 6 is a perspective view of a protecting of the present invention for enclosing a coaxial connector assembly shown in another preferred embodiment.

Referring to FIG. 6, a C-clip 36 engages with the annular groove (332 and 322) to secure the protecting cover 1. The annular holding means 34 and the C-clip 36 are optionally selected by the user.

Basically, the protecting cover 1 is made of nylon material which is able to prevent the accumulation of charge and can prevent interference between cables.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A protecting cover for a coaxial connector assembly which is formed by a T-type connector and relating cable terminals comprising a first half T-shaped casing portion and a second half T-shaped casing portion; said casing portions being pivotally connected and releasably receiving the coaxial connector assembly therein;

said first casing portion comprising a first longitudinal portion and a first lateral portion, and said second casing portion comprising a second longitudinal portion and a second lateral portion; said longitudinal portions and said lateral portions being sufficiently long to enclose the coaxial connector assembly; two plug portions extending from said first lateral portion on both sides of said first longitudinal portion, and two socket portions for receiving said two plug portions being formed in a corresponding position on said second lateral portion, thereby engaging said casing portions together; a hook extending from one of said casing portions for hanging said protecting cover with the coaxial connector assembly therein in an appropriate position;

whereby said first and said second lateral portions are respectively formed with first half-annular protrusions and second half-annular protrusions on each end thereof, such that when said first and said second casing portions are engaged together, said first half-annular protrusion and said second half-annular protrusion form an annular protrusion; each said first half-annular protrusion and each said second half-annular protrusion respectively have a shoulder portion and an end portion; an annular holding means for securing said annular protrusion for further engaging said first and second half casing portions, with the shoulder portions blocking the annular holding means in one direction.

2. A protecting cover as claimed in claim 1, wherein a cap means is used to cover any open end of said protecting cover for preventing dust from entering therein.

3. A protecting cover for a coaxial connector assembly which is formed by a T-type connector and relating cable terminals comprising a first half T-shaped casing portion and a second half T-shaped casing portion; said casing portions being pivotally connected and releasably receiving the coaxial connector assembly therein;

said first casing portion comprising a first longitudinal portion and a first lateral portion, and said second casing portion comprising a second longitudinal portion and a second lateral portion; said longitudinal portions and said lateral portions being sufficiently long to enclose the coaxial connector assembly; two plug portions extending from said first lateral portion on both sides of said first longitudinal portion, and two socket portions for receiving said two plug portions being formed in a corresponding position on said second lateral portion, thereby engaging said casing portions together; a hook extending from one of said casing portions for hanging said protecting cover with the coaxial connector assembly therein in an appropriate position;

whereby said first and said second lateral portions are respectively formed with first half-annular protrusions and second half-annular protrusions on each end thereof, such that when said first and said second casing portions are engaged together, said first half-annular protrusion and said second half-annular protrusion form an annular protrusion; each said first half-annular protrusion and each said second half-annular protrusion respectively having a shoulder portion and an end portion; a first-annular groove being formed in each said first half-annular protrusion substantially between said shoulder portion and end portion thereof and a second half-annular groove being formed in each said second protrusion substantially between said shoulder portion and said end portion thereof, such that when said first casing portion and said second casing portion are engaged, said first and said second half-groove together form an annular groove; a C-clip engages with said annular groove to secure said protecting cover.

4. A protecting cover as claimed in claim 3, wherein a cap means is used to cover any open end of said protecting cover for preventing dust from entering therein.

* * * * *